United States Patent [19]

Bradley, Jr. et al.

[11] 3,911,060

[45] Oct. 7, 1975

[54] CONTROL SYSTEM FOR INJECTION COOLING TOWERS

[75] Inventors: Wilson E. Bradley, Jr., Ellicott City; Edward N. Schinner, Silver Spring, both of Md.

[73] Assignee: Baltimore Aircoil Company Inc., Jessup, Md.

[22] Filed: Sept. 12, 1973

[21] Appl. No.: 396,645

Related U.S. Application Data

[62] Division of Ser. No. 144,855, May 19, 1971, Pat. No. 3,785,626.

[52] U.S. Cl. .................... 261/27; 55/226; 55/257; 62/31 C; 62/314; 165/12 C; 261/131; 261/137; 261/150; 261/36 R; 261/39 R; 261/44 R; 261/65; 261/DIG. 54
[51] Int. Cl.² ........................................ B01D 3/04
[58] Field of Search .............. 261/27, 39 R, 65, 151, 261/150, 116, 131, 36 R, 50, 44 R, 137, DIG. 54; 55/226, 257; 165/12 C; 62/310, 314

[56] References Cited
UNITED STATES PATENTS

| 2,535,008 | 12/1950 | Crawford | 261/39 R |
| 2,550,683 | 5/1951 | Fletcher et al. | 261/116 X |
| 3,403,524 | 10/1968 | Mitchell et al. | 261/27 X |

*Primary Examiner*—Frank W. Lutter
*Assistant Examiner*—William Cuchlinski, Jr.
*Attorney, Agent, or Firm*—Michael C. Sudol, Jr.

[57] ABSTRACT

A control system for injection evaporative heat exchangers comprised of a chamber having a mouth, a throat, and a region downstream of the throat between it and the exhaust opening. Water is injected into the throat and induces air flow into the mouth and causes mixed concurrent flow downstream of the throat. Air is discharged from the exhaust opening and cooled water is collected. Controls are provided by which the amount of air pumped per unit time is controllable to accommodate the unit to variable heat load conditions.

1 Claim, 8 Drawing Figures

CONTROL SYSTEM FOR INJECTION COOLING TOWERS

This is a division of application Ser. No. 144,855 filed May 19, 1971 now U.S. Pat. No. 3,785,626.

This invention relates to evaporative heat exchangers of the injection type in which water jets pump air for concurrent flow to effect evaporation of the water to extract heat from a medium such as the water itself in the case of a cooling tower or some other medium in the case of an indirect heat exchanger. More particularly, this invention is directed to controls for adjusting the capacity of such evaporative heat exchangers.

Cooling towers and evaporative condensers as an example of an indirect heat exchanger, as they have been known in the past whether they be concurrent, countercurrent or cross flow, involve fans to pump the air and pumps to pump the water. The water flows over surfaces such as wet deck fill in the case of a cooling tower or heat exchange tubes in the case of an evaporative condenser. Heat extracted from the medium to be cooled supplies the latent heat of vaporization necessary to vaporize some of the water which is then removed from the system by the air. In apparatus of this type, when there is a lower than design capacity heat load, it is relatively easy to reduce cooling capacity by simply shutting off the air fans. Indeed precise control usually involves cyclic operation of the air fans or modulation of the air volume in response to temperature changes in the circulating water.

In an injection type evaporative heat exchanger such as a cooling tower or evaporative condenser, it is, of course, not possible to shut off the air while the water continues to flow since it is the flow of water which pumps the air.

It is therefore an object of the present invention to provide for the reduction in capacity of an injection type evaporative heat exchanger. The invention takes a number of forms directed to reducing the air flow and intimate air-water contact downstream of the throat. Thus, it is that an object of the present invention is to provide reliable and convenient ways of accommodating the same basic apparatus to both high and low load conditions and to operation in widely varying conditions of the ambient.

Other objects and advantages of the present invention will be apparent upon consideration of the following detailed description of several embodiments thereof taken in conjunction with the annexed drawings wherein.

Figure 2:
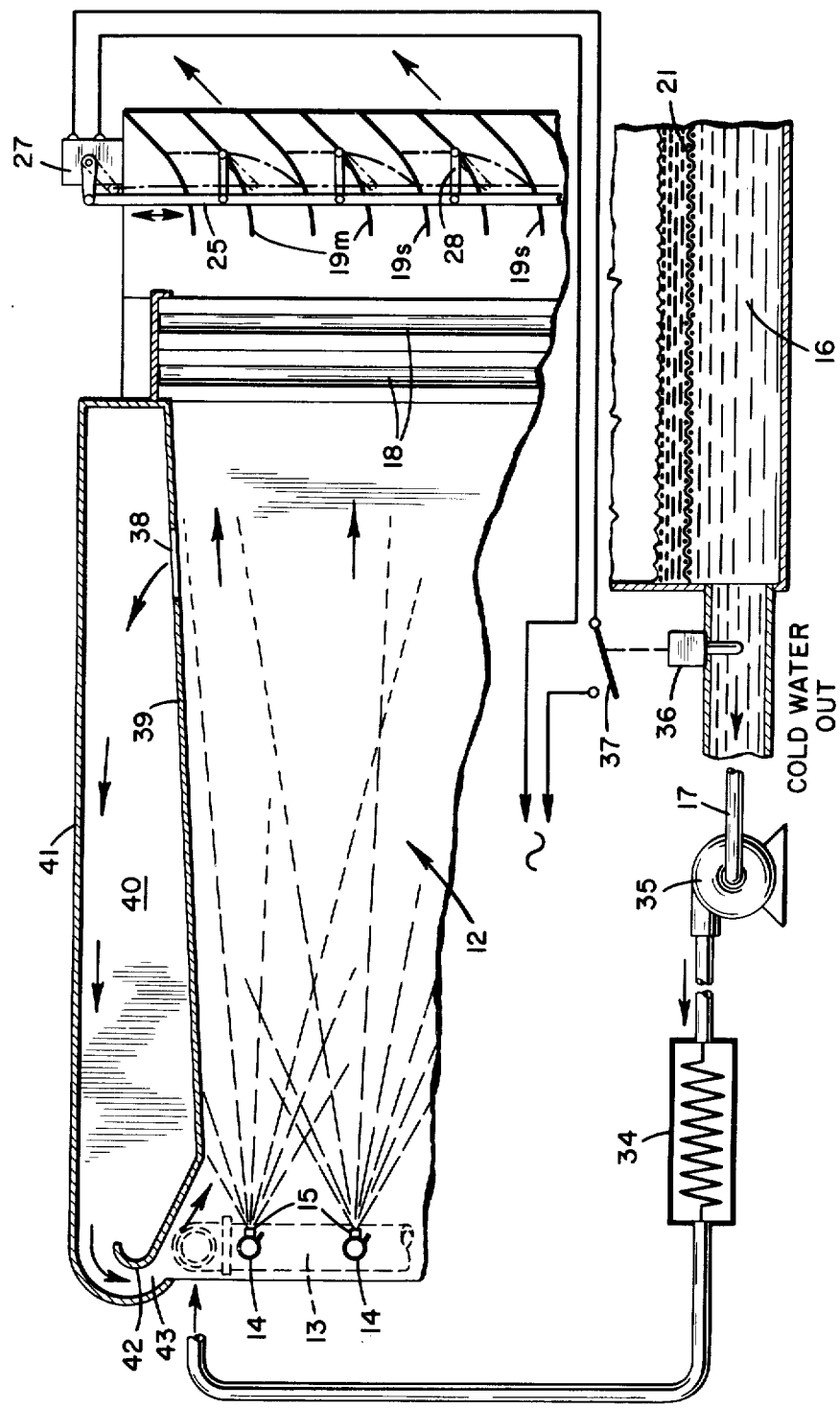
FIG. 2 is a fragmentary view in section and in side elevation of a pressure relief system also for use when the apparatus is operated below available capacity.
Figure 3:
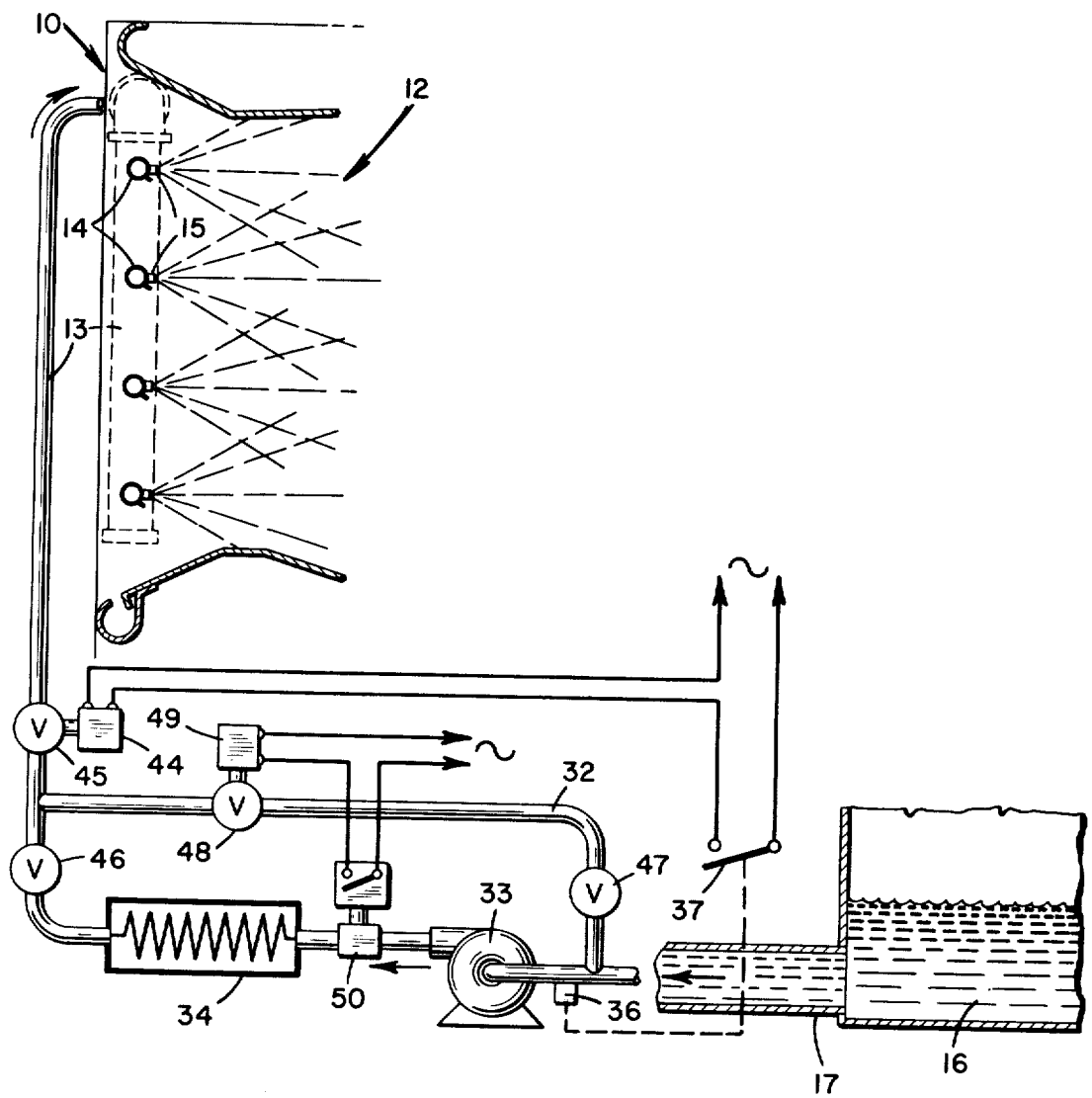
FIG. 3 is still another fragmentary view partly in section and partly in side elevation showing a third system for operating below available capacity.

Before referring specifically to the figures of drawing, it is to be emphasized that the controls which form the subject of this invention are useable with any type of injection evaporative heat exchanger whether the flow axis be horizontal, vertically down, vertically up, or diagonal, and regardless of whether the apparatus be a cooling tower, an evaporative condenser or other cooling system. The arrangements of FIGS. 1, 2 and 3 are described in conjunction with horizontal flow cooling towers as an example of a typical condition of use.

Figure 1:
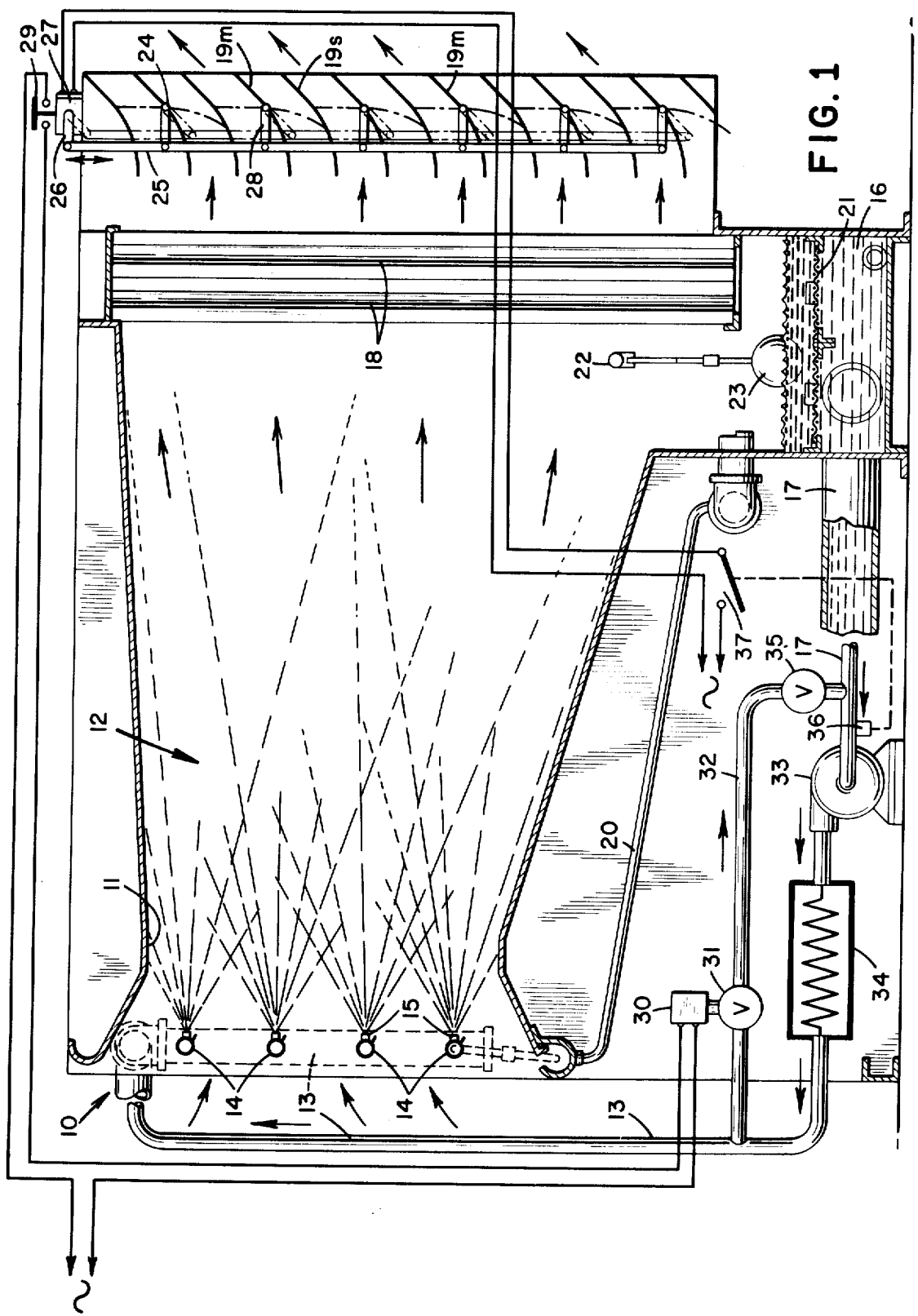
FIG. 1 is a view partly in side elevation and partly in section of a horizontal injection type cooling tower incorporating movable dampers with a system for reducing air pumping energy when the apparatus is operated much below available capacity.

Referring to FIG. 1 in greater detail, the apparatus there shown comprises a cooling tower having an air entry mouth at 10, a throat at 11, and downstream of the throat, a diffusion or expansion region 12. Water to be cooled is supplied through a header 13 to a series of horizontal conduits 14, each provided with nozzles 15 spaced along the length of the respective conduit 14. Water is sprayed from the nozzles 15, and this action draws air into the mouth 10 of the apparatus. The nozzles 15 are so spaced and the spray therefrom is of such shape that a water seal is established across the throat 11. The air which is drawn into the mouth 10 and passes through the throat 11, mixes intimately with the droplets of water. Flow continues through the diffusion region 12. Evaporative cooling takes place because some of the water is evaporated and the heat of vaporization is extracted from the remaining water which, moving from left to right as seen in FIG. 1, falls into the sump 16 from which it may be withdrawn by conduit 17 to be used. The air exhausts from the tower through a group of mist eliminators 18 which strip out any remaining water entrained thereby so that the substantially droplet free air discharging from the eliminators 18 is passed to atmosphere through turning vanes 19. These vanes cause the air to flow upwardly and away from the cooling tower to avoid recirculation of the hot discharged air to the region of the mouth 10.

The particular nozzle structures, the blowdown arrangement 20, and the particular mist eliminators used are disclosed in a co-pending application having the same filing date as this application. The sump is provided with the usual strainer screen 21 and with make-up water spigot 22 controlled by a float 23 in the conventional manner. That is to say, when the water level falls below a pre-determined value the sinking of float 23 opens the spigot 22 and make-up water is added to the system.

Pressure and flow of water in an injector type evaporative heat exchanger determine mixing, atomization and the amount of air entrainment and hence govern heat transfer. Hence, to control pressure and flow of water is one way to control capacity. The other variable subject to control is the air and an example of this is shown in the arrangement of FIG. 1. To this end, the louvers 19 are made up of a set of stationary louvers 19s in between each pair of which is located a movable louver or damper 19m. The movable dampers 19m are each pivoted at 24 for movement from the solid line position of FIG. 1 to the broken line position of that figure. Note that the dampers or louvers are so shaped that in all positions of the dampers 19m the air is directed upwardly and outwardly from the exhaust opening. In the closed position each movable damper 19m blocks the air space between two adjacent stationary louvers 19s. Pivotal movement about the axis 24 from an open to a closed position is effected by a rod 25 connected to a crank 26 which is movable by, for example, an electrical actuating means 27 from the full line position to the broken line position of FIG 1. As the crank 26 moves between the two positions the rod 25 is also moved. Links 28 connect the rod 25 to the respective movable dampers 19m so that movement of the crank 26 and the rod 25 results in simultaneous movement of the dampers 19m to the degree commanded by the drive mechanism 27.

It will be understood that the effect of throttling the dampers 19 is to reduce the cooling capacity of the unit when the water temperature in the sump 16 is lower than operating conditions require. The dampers can be throttled from about 50 to 80 per cent of full air flow before the pressure in the diffuser section 12 builds up to a point where eddy currents and blow-back occur through the water seal at the throat 11. This amount of air reduction is satisfactory for most applications, but when more than about 50 to 80 per cent shut-off is required the illustrated apparatus is so adjusted that when the dampers 19m are about 50 to 80 per cent closed an electric switch 29 closes and this operates an electric valve mechanism 30 associated with a valve 31 to reduce the water supply to the nozzles 15.

It will be noted that valve 31 is located in a bypass line 32 which extends from the warm water line 13 to cold water discharge line 17. This line 32 bypasses the cooling tower. When the dampers 19m are fully closed, valve 31 is opened to such an extent that some of the water issuing from the heat load 34 is bypassed through line 32 to the intake side of the pump 33. A manual metering valve 35 controls the effective orifice of the bypass conduit. As the output from the pump 33 is divided between line 13 and bypass line 32, the pressure at the nozzles 15 is reduced. Thus the air pumping energy has been reduced so that excessive pressures within the diffusion zone will not any longer cause blow-back through the mouth of the cooling tower.

The operation of the louvers and the nozzle throttle is all triggered by a sensing device 36 located in the cold water line 17 issuing from the sump 16. When the temperature falls below a predetermined value, this sensing device closes a switch 37 which actuates the circuit to the crank operator mechanism 27. If the movement of the dampers 19m exceeds about 50 – 80 per cent of full closure, switch 29 is also closed so that valve 31 opens to produce the effect described above.

It will be realized that once valve 31 is open and the pressure at nozzles 15 is reduced, the capacity of the unit is reduced. Accordingly the thermal switch 36 may command another position of the dampers, a more open position if the correction is more than was needed and a more closed position if it was not yet adequate. With the throttling back of the nozzles, the dampers may move to fully closed position without blow-back. In the event they begin to reopen, the connections between motor 27 and switch 29 are such that movement of the dampers in the opening direction will not immediately cause valve 31 to close again so that the system may stabilize without hunting.

Another way of controlling throttling down is shown in FIG. 2 which is a view basically similar to FIG. 1. The parts have similar numbers except that in the arrangement of FIG. 2 the bypass between the intake of the pump and the hot water feed to the spray nozzles is omitted and the excessive pressures within the diffusion region 12 are instead relieved through a slot 38 in the top wall 39 of the cooling tower. In this instance when the motor 27 has been commanded by the sensor 36 to close the movable dampers 19m, the water spray continues normally, but the increase in static pressure in the diffusion region 12 causes air to escape in the direction of arrows into the plenum 40 located above the upper wall 39 of the cooling tower. Of course, when the dampers 19m are closed, there is increased resistance to air flow therethrough. Thus air pumping capacity is reduced by this added resistance even though the pumping energy at the nozzles remains the same. The upper defining wall 41 of the plenum 40 extends around the bell mouth 42 of the inlet mouth 10 and defines with it an air supply slit 43 through which some air is recycled to the intake side of the system which is recirculation of hot air and permits an effective partial shut-down without adjusting the pressure of the water. When the dampers 19m are open, the static pressure in the diffuser section 12 is very low so that very little air is bled through the slot 38 so that recirculation of the hot air is automatically eliminated when it is not desired or needed.

Figure 6:
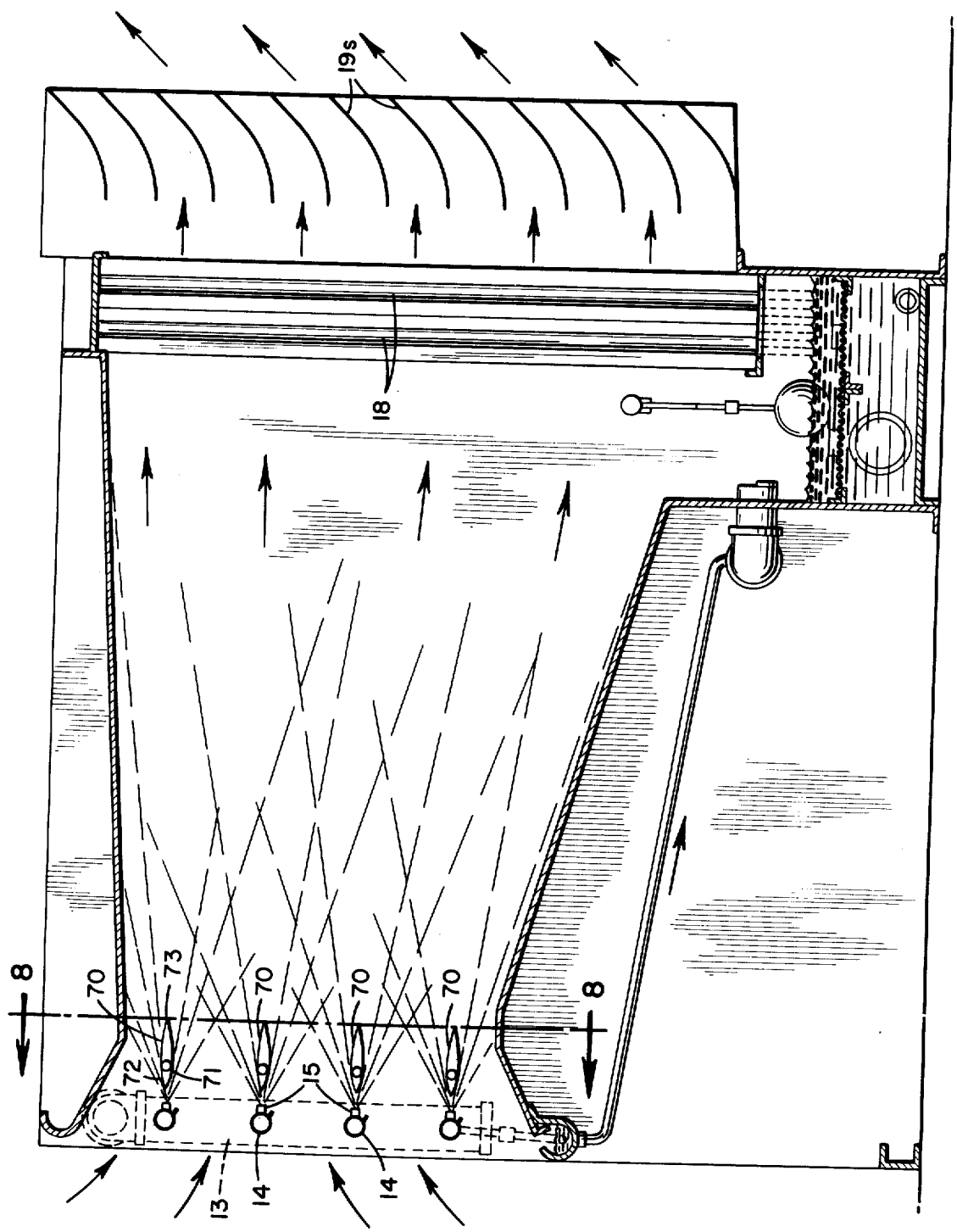
FIG. 6 is a view of a horizontal flow injector cooling tower equipped with dampers associated with the nozzles in such a way as to be movable from the illustrated horizontal position in which flow from the nozzles is normal to a depending or angular position in which spray from the nozzles is quenched.

Capacity control can also be achieved by a bypass valve in the piping system which functions to reduce the operating pressure at the nozzles 15 and hence to regulate the capacity of the unit to meet a variable load demand without the use of movable dampers such as 19m but, for example, with the use of fixed louvers 19s spaced as shown in FIG. 6. In this instance the arrangement shown in FIG. 3 may be employed. Here a temperature sensor 36 senses the water temperature in cold water outlet 17 from sump 16. When the water temperature is at a pre-determined low level the sensor 36 causes switch 37 to close. Switch 37 in this instance actuates a valve motor 44 which actuates a valve 45 in a closing direction. In this instance the water circuit includes a pump 33 and a heat load 34 in common with the arrangement of FIG. 2 but also includes a bypass line 32 as shown in FIG. 1. The valves are different however. There is a manual valve 46 between the outlet of the load at 34 and the bypass 32. There is another manual valve 47 in the bypass line and a valve 48 in the bypass line which is operated by a motor 49 which is actuated in response to a pressure sensor 50 which reads pressure at the output of pump 33.

In the arrangement of FIG. 3 the louvers may be in fixed position as shown in FIG. 6. When it is desired to throttle down the capacity of the unit, the temperature sensor 36 causes motor 44 partially to close valve 45. When this happens, the pressure at the output side of the pump goes up. The sensor 50 detects the increase in discharge pressure of pump 33 and opens valve 48 enough to maintain the pump discharge pressure substantially constant. By maintaining a constant pump discharge pressure the horse power of a centrifugal pump remains constant hereby preventing motor overloads that would occur if the pressure were reduced.

Valve 46 is used to adjust the proper pressure at the tower when the bypass line 32 is closed. Because of the large pressure drop required by the bypass line, it can be of a size much smaller than the main water line. At full bypass, the desired pump discharge pressure is initially adjusted with hand valve 47 in the bypass line 32.

In FIGS. 1 and 2 the water pumps 33 operate normally that is to say, when the system is throttled down the pump continues to circulate the same amount of water but some of the water is bypassed so that not all of the output of the pump is delivered to the nozzles 15. In the arrangement of FIG. 2, there is, of course, no change in the water pumping conditions. However, in the arrangements shown in FIGS. 4, 5 and 6 reduction in water supply is effected by changing the output of the pumps.

Figure 4:
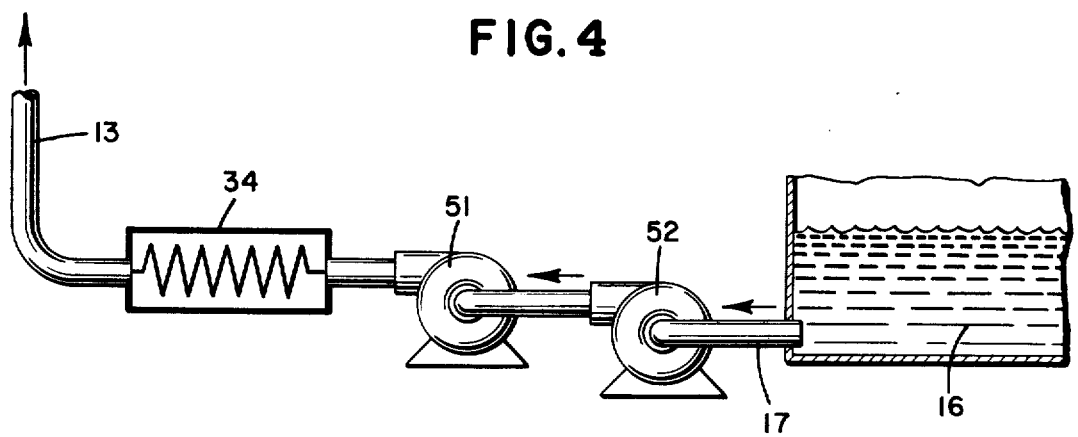
FIG. 4 is a fragmentary schematic view of a capacity varying arrangement involving pumps in series.

In FIG. 4 there are shown two pumps 51 and 52 for delivering water from the outlet 17 of the sump 16 through the heat load 34 back to the nozzles through the conduit 13. Pumps 51 and 52 are so designed that they may both be operated in series or either may be shut off so that the other can operate independently. If these pumps have different delivery capacities, it is easy to see that gradations of delivery of water are possible. Suppose, for example, that the series capacity of the two pumps is X and that pump 51 provides 70 percent of X and pump 52 30 percent of X. In such a case the work done on the water flowing to the nozzles is variable from X to seventy percent of X or even to thirty percent of X, as load conditions may require. The pumps may be automatically controlled by temperature sensors such as are shown in FIGS. 1, 2 and 3.

Figure 5:
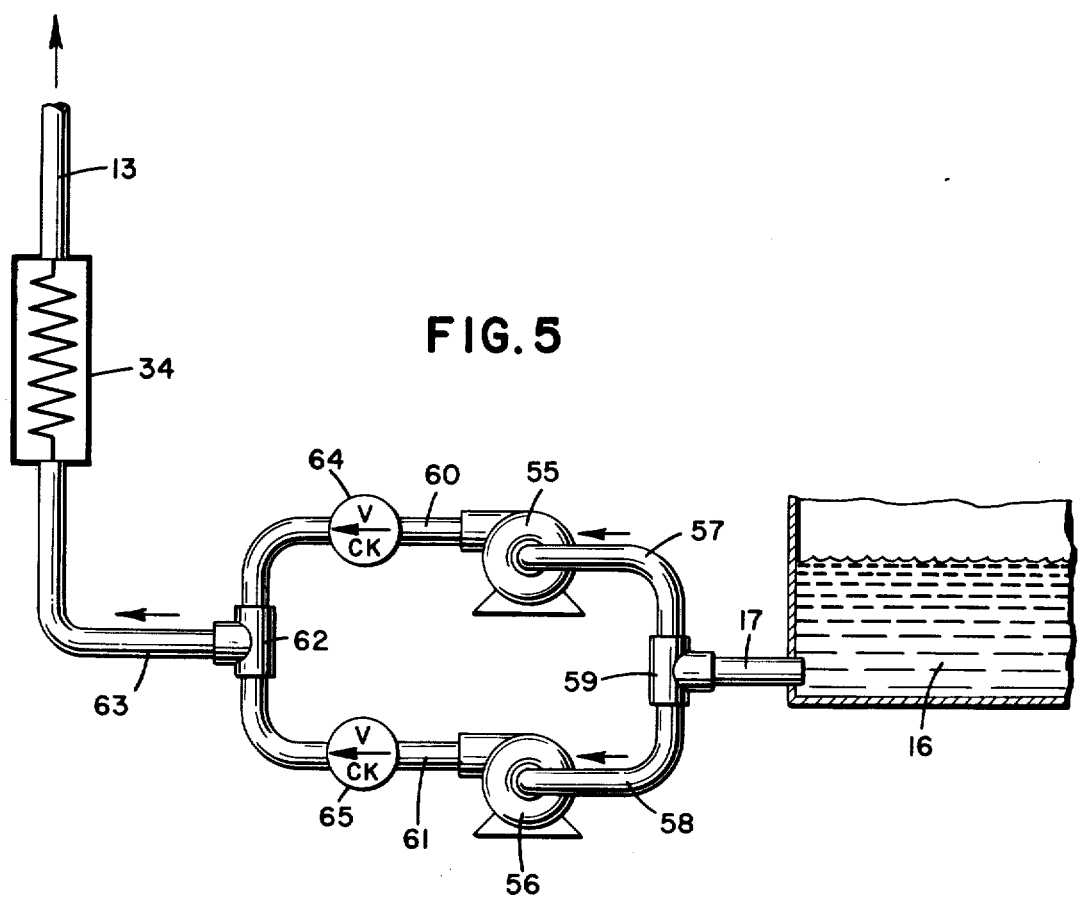
FIG. 5 is a two water pump arrangement with the pumps arranged in parallel between the cooled water supply and the heat load.

Instead of having two pumps in series as shown in FIG. 4, one may have also two pumps 55 and 56 in parallel, see FIG. 5. In this case, between the line 17 leading from the sump 16 and the intake of the pumps 55 and 56, there are interposed two branches 57 and 58 leading from a T 59 which also serves conduit 17 which leads from the sump 16. There are also conduits 60 and 61 leading from the output of each pump to a T 62 also connected to a line 63 leading to heat load 34. As in the case of pumps 51 and 52, pumps 55 and 56 may be of unequal capacity. Check valves 64 and 65 are located in conduits 60 and 61 respectively so that it is possible to operate either or both pumps whereby to get gradations of the energy put into the water supplied to the nozzles 15.

Figure 7:
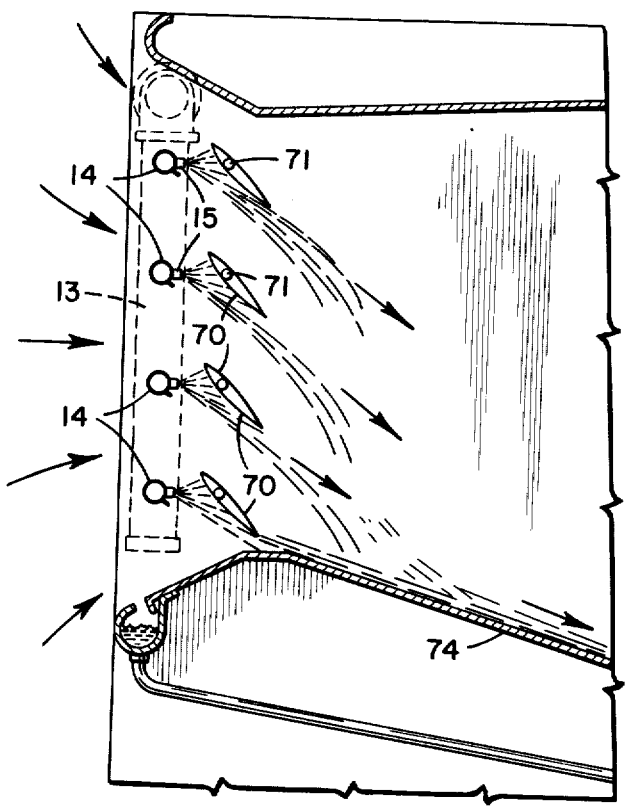
FIG. 7 is a fragmentary view similar to FIG. 6 but showing the dampers in the spray quenching position.
Figure 8:
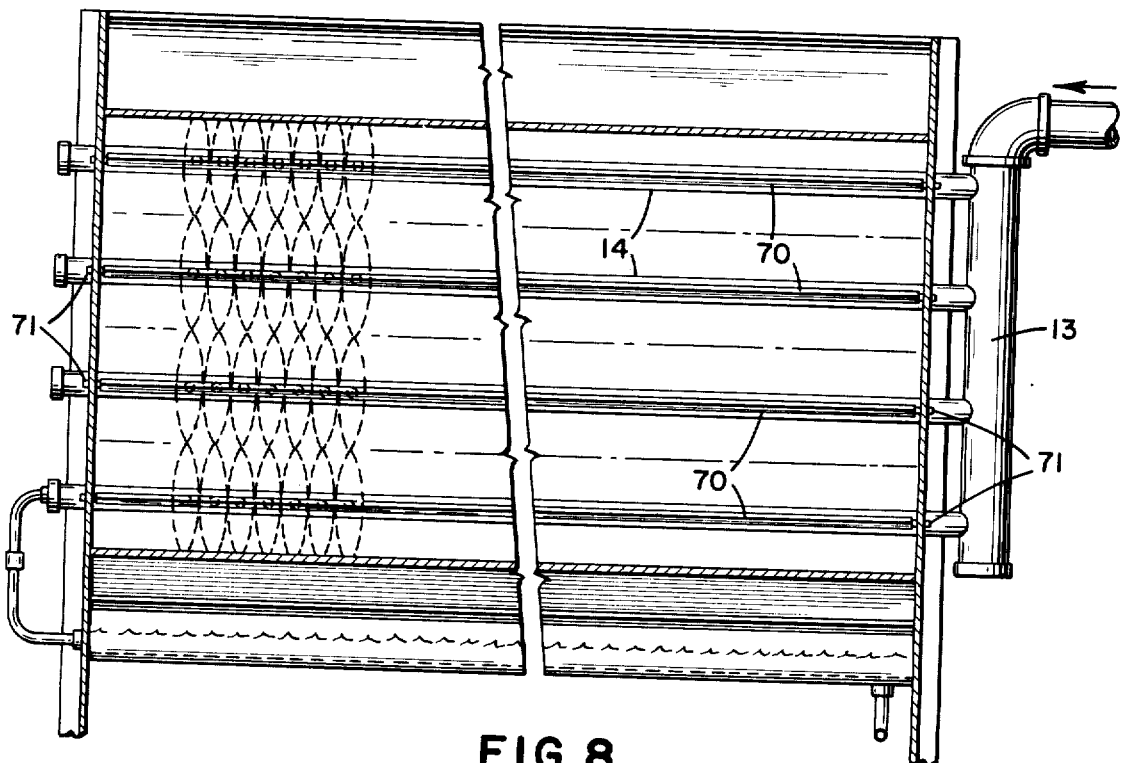
FIG. 8 is a view in section taken on the line 8 — 8 of FIG. 6.

In FIGS. 6, 7 and 8 there is shown still another modification of the present invention. In this case no movable dampers 19m are employed in the air exhaust area but instead fixed vanes 19s are arranged to guide exhausting air upwardly and outwardly of the cooling tower. The water supply in FIG. 6 is as shown in FIG. 1 and like numerals are used to identify like parts.

In front of each row of nozzles there is arranged a streamlined damper 70 mounted on a shaft 71 and movable by conventional means not shown from a normal, horizontal position such as is shown in FIG. 6 to a dependent position such as is shown in FIG. 7. The shafts 71 each lie parallel to the respective conduits 14 and actually intersect the axis of the nozzles 15. An examination made of FIGS. 6 and 8 reveals that the streamlined damper 70, in their normal positions, lie each with its leading and trailing edges 72 and 73, respectively, exactly centered respecting the axis of the nozzles 15.

The spray issuing from the nozzles 15 is in the form of a flat fan-like jet with the flat sides generally vertical, see FIG. 8. The dampers 70 bisect the flat sides of the sprays when they are in the FIG. 6 position, and in this position the effieiency of the spray in pumping air and in mixing with the air is not impaired by the presence of the pressure of the dampers. If, however, it is desired to reduce the amount of air pumped below design capacity, a very simple and easy way to do this is to pivot one or more of the dampers 70 to a dependent position as shown in FIG. 7. As soon as the damper is moved out of its horizontal position, it commences to quench the spray from the nozzle. This greatly reduces air-water contact and air flow. The water projecting from the nozzles 15 strikes against the dampers 70 and is directed to cascade along the lower wall 74 of the cooling tower.

From FIG. 8 it can be seen that the shafts 71 on which the dampers 70 are mounted have not been shown as connected to anything for driving them. It is contemplated that they may be driven either separately or in unison by an conventional mechanism which will hold them in a desired position of adjustment.

The dampers of FIGS. 6, 7 and 8 are also effective with sprays of shapes other than those here illustrated.

The invention may be embodied in other specific forms without departing from the spirit or essential characteristics hereof. The embodiment and the modification described are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An evaporative heat exchanger comprising an injector having means defining an air intake opening, an air and water mixing region, a region downstream of said air and water mixing region, means defining an exhaust opening, means to spray water into said air and water mixing region to induce air flow into said intake opening and flow concurrent with said water through said air and water mixing region and downstream region, means to collect the sprayed water, a return conduit connecting said collecting means to said spray means, a pump in said conduit, a bypass conduit, a normally closed valve in said bypass conduit, a normally open valve in said return conduit between said bypass conduit and said spray means, means responsive to the temperature of the water entering said pump to cause said normally open valve to move in a closing direction, when the temperature of the water entering said pump falls to a predetermined temperature which predetermined temperature is below the temperature of the sprayed water, means responsive to water pressure increase at the outlet of said pump to cause said normally closed valve to move in an opening direction to maintain a substantially constant pump discharge pressure.

* * * * *